United States Patent
Park

(10) Patent No.: US 9,825,333 B2
(45) Date of Patent: *Nov. 21, 2017

(54) POLYVINYLPYRIDINE ADDITIVES FOR NONAQUEOUS ELECTROLYTES ACTIVATING LITHIUM RECHARGEABLE ELECTROCHEMICAL CELLS

(71) Applicant: Greatbatch Ltd., Clarence, NY (US)

(72) Inventor: Chi-Kyun Park, Cheektowaga, NY (US)

(73) Assignee: Greatbatch Ltd., Clarence, NY (US)

( * ) Notice: Subject to any disclaimer, the term of this patent is extended or adjusted under 35 U.S.C. 154(b) by 511 days.

This patent is subject to a terminal disclaimer.

(21) Appl. No.: 14/499,310

(22) Filed: Sep. 29, 2014

(65) Prior Publication Data

US 2015/0017552 A1 Jan. 15, 2015

Related U.S. Application Data

(62) Division of application No. 12/271,002, filed on Nov. 14, 2008, now Pat. No. 8,940,443.

(60) Provisional application No. 61/088,375, filed on Aug. 13, 2008.

(51) Int. Cl.

| | | |
|---|---|---|
| *H01M 10/0567* | (2010.01) | |
| *H01M 10/052* | (2010.01) | |
| *H01M 10/0525* | (2010.01) | |
| *H01M 10/058* | (2010.01) | |
| *H01M 6/16* | (2006.01) | |
| *H01M 10/04* | (2006.01) | |
| *H01M 10/0565* | (2010.01) | |
| *H01M 10/0568* | (2010.01) | |
| *H01M 10/0569* | (2010.01) | |
| *H01M 4/131* | (2010.01) | |
| *H01M 4/133* | (2010.01) | |
| *H01M 4/525* | (2010.01) | |
| *H01M 4/587* | (2010.01) | |
| *H01M 4/62* | (2006.01) | |
| *H01M 4/66* | (2006.01) | |

(52) U.S. Cl.
CPC ..... *H01M 10/0567* (2013.01); *H01M 10/052* (2013.01); *H01M 10/058* (2013.01); *H01M 10/0525* (2013.01); *H01M 4/131* (2013.01); *H01M 4/133* (2013.01); *H01M 4/525* (2013.01); *H01M 4/587* (2013.01); *H01M 4/623* (2013.01); *H01M 4/661* (2013.01); *H01M 6/168* (2013.01); *H01M 10/04* (2013.01); *H01M 10/0565* (2013.01); *H01M 10/0568* (2013.01); *H01M 10/0569* (2013.01); *H01M 2220/30* (2013.01); *H01M 2300/0042* (2013.01); *Y02E 60/122* (2013.01); *Y02P 70/54* (2015.11); *Y10T 29/49108* (2015.01)

(58) Field of Classification Search
CPC ........... H01M 10/0567; H01M 10/052; H01M 10/04; H01M 10/0565; H01M 10/0568; H01M 10/0569; H01M 10/0525; H01M 10/058; H01M 6/168; H01M 4/131; H01M 4/133; H01M 4/525; H01M 4/587; H01M 4/623; H01M 4/661; H01M 2220/30; H01M 2300/0042; H01M 2300/004; Y02E 60/122

See application file for complete search history.

(56) References Cited

U.S. PATENT DOCUMENTS

| | | |
|---|---|---|
| 3,937,764 A | 2/1976 | Horikawa et al. |
| 4,284,692 A | 8/1981 | Rao et al. |
| RE31,489 E | 1/1984 | Sekido et al. |
| 5,342,710 A | 8/1994 | Koksbang |
| 5,487,959 A | 1/1996 | Koksbang |
| 5,693,434 A | 12/1997 | Li et al. |
| 5,723,231 A | 3/1998 | Wu et al. |
| 5,807,412 A | 9/1998 | Li et al. |
| 6,291,107 B1 | 9/2001 | Shimizu |
| 6,746,804 B2 | 6/2004 | Gan et al. |
| 6,822,065 B1 | 11/2004 | Sanchez et al. |
| 6,841,303 B2 | 1/2005 | Park et al. |
| 7,138,211 B2 | 11/2006 | Takizawa et al. |
| 7,220,519 B2 | 5/2007 | Roh et al. |
| 8,940,443 B2 * | 1/2015 | Park .................. H01M 10/0567 429/231.1 |
| 2002/0136959 A1 | 9/2002 | Park et al. |
| 2003/0124430 A1 | 7/2003 | Takizawa et al. |
| 2004/0013925 A1 | 1/2004 | Komiya |

(Continued)

FOREIGN PATENT DOCUMENTS

| | | |
|---|---|---|
| EP | 1770817 | 4/2007 |
| KR | 20040000129 | 1/2004 |
| WO | 2004006378 | 1/2004 |

OTHER PUBLICATIONS

EP Search, "09167862.3", 20091116, Nov. 16, 2009.
Komaba, et al., "Impact of 2-Vinylpyridine as Electrolyte Additive on Surface and Electrochemistry of Graphite for C/LiMn2O4 Li-Ion Cells", Journal of the Electrochemical Society: 152(5) A937-A946 (2005), A937-A946.

(Continued)

*Primary Examiner* — Laura Weiner
(74) *Attorney, Agent, or Firm* — Michael F. Scalise

(57) ABSTRACT

An electrolyte comprising an organic solvent, a lithium salt, and a polymer additive comprised of repeating vinyl units joined to one or more heterocyclic amine moieties is described. The heterocyclic amine contains five to ten ring atoms, inclusive. An electrochemical cell is also disclosed. The preferred cell comprises a negative electrode which intercalates with lithium, a positive electrode comprising an electrode active material which intercalates with lithium, and the electrolyte of the present invention activating the negative and the positive electrodes.

26 Claims, 2 Drawing Sheets

(56) References Cited

U.S. PATENT DOCUMENTS

| | | |
|---|---|---|
| 2004/0131944 A1 | 7/2004 | Visco et al. |
| 2005/0019670 A1 | 1/2005 | Amine et al. |
| 2005/0042519 A1 | 2/2005 | Roh et al. |
| 2006/0234102 A1 | 10/2006 | Nakato et al. |
| 2007/0172739 A1 | 7/2007 | Visco et al. |
| 2008/0160404 A1 | 7/2008 | Lin et al. |

OTHER PUBLICATIONS

Takeuchi, et al., "Anode Passive and Electrolyte Solvent Dispropertionation: Mechanism of Ester Exchange Reaction in Lithium-Ion Batteries", J. Electrochem. Soc., vol. 144, No. 6, Jun. 1997; The Electrochemical Society, Inc., Jun. 1997, 1944-1948.

\* cited by examiner

POLYVINYLPYRIDINE ADDITIVES FOR NONAQUEOUS ELECTROLYTES ACTIVATING LITHIUM RECHARGEABLE ELECTROCHEMICAL CELLS

CROSS REFERENCE TO RELATED APPLICATIONS

This application is a divisional of U.S. patent application Ser. No. 12/271,002, filed on Nov. 14, 2008, now U.S. Pat. No. 8,940,443, which claims priority from U.S. provisional application Ser. No. 61/088,375, filed Aug. 13, 2008.

BACKGROUND OF THE INVENTION

1. Field of the Invention

This invention relates to an electrochemical cell having a nonaqueous electrolyte and, particularly, to a rechargeable lithium ion cell. The activating electrolyte is provided with a polymer additive comprised of repeating vinyl units joined to one or more heterocyclic amine moieties. This improves the cycle life and shelf life of the cells.

2. Description of Related Art

The use of rechargeable lithium-ion secondary cells in portable electronic equipment such as cell phones, PDAs, and laptop computers, and in small medical devices such as neurostimulators and insulin pumps has continued to increase in recent years. In the medical device industry, the requirements for these cells imposed by the Food and Drug Administration and by the device manufacturers are very stringent. In particular, it is important that these cells have a stable and predictable shelf life prior to use, so that they can receive an initial charge and be reliably placed into service. Additionally, they must be capable of being repeatedly discharged and recharged in a predictable manner during their life cycles.

Rechargeable lithium-ion secondary cells are generally comprised of a negative electrode (anode), a positive electrode (cathode) and an intermediate separator. The typical fabrication of such a cell involves winding the anode, cathode and separator to form a jellyroll, or sequentially arranging the anodes and cathodes which are provided as plates to form a cell stack. The jellyroll or cell stack is then housed in a metal (titanium or titanium alloy, stainless steel, aluminum) casing or aluminum laminated packaging film, and then filled with electrolyte. This is followed by sealing the casing by welding, or by sealing the packaging film using suitable means such as a foot sealer.

There has been considerable investigation into the use of electrolyte additives to improve cycle life and shelf life of rechargeable cells such as lithium ion cells. In particular, optimized electrolyte compositions are important to obtain lithium ion cells having improved cycle performance and shelf life. Most of the reported additives are comprised of monomers, which are intended to beneficially modify the solid electrolyte interface (SEI) layer on the anode surface during charging the cells. The formation of a surface film is unavoidable for alkali metal anodes, and in particular, lithium metal anodes and lithium intercalated carbon anodes due to their low potential and high reactivity towards organic electrolytes. Once formed, the SEI layer prevents further reaction of the electrolyte on the anode surface, thereby improving the cycle performance of the cells.

Ethylene carbonate is known to form a stable SEI layer on an anode surface at approximately 0.8V vs. Li/Li$^+$. The SEI layer influences several important aspects of battery performance such as cycle life, power capability and self-discharge rate or shelf life. Preferably, the SEI layer formed on the anode surface is relatively thin and of a uniform thickness. If it is not uniform, a relatively thick SEI layer will be formed on the electrode surface due to lithium deposition on the anode. This results in poor cycle life and higher self-discharge rate due to consumption of additional electrolyte on the electrode surface.

Various electrolyte additives have been disclosed which form a passivation layer on an electrode, stabilize the passivation layer, improve thermal stability of the electrolyte and cell, and improve overcharge safety. Although the cyclic performance and shelf life of lithium ion cells has been improved significantly by using organic additives in electrolytes, there remains a considerable need for further improvements in order to satisfy the increasingly stringent performance requirements in new cell applications.

SUMMARY OF THE INVENTION

The present invention meets this need by providing a rechargeable secondary electrochemical cell having an improved electrolyte. The electrolyte is comprised of an organic solvent, an alkali metal salt, and a polymer additive comprised of repeating vinyl units joined to one or more heterocyclic amine moieties. The heterocyclic amine may contain five or six ring atoms. One preferred heterocyclic amine is pyridine, with the additive thus being poly(2-vinylpyridine). Alternatively, the additive may be a copolymer having the general formula:

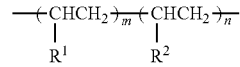

wherein R$^1$ is a heterocyclic amine containing five or six ring atoms, and R$^2$ is an aromatic compound, or an acrylate containing at least four carbon atoms. In the copolymer, m is preferably in the range of 20 to 100 mole percent.

The polymer additive may be present at a concentration of between about 0.05 and about 1.0 weight percent of the electrolyte, and is completely dissolved in the solvent in the described concentration range. Preferred organic solvents are carbonate solvents. The polymer additive preferably has a molecular weight of at least about 5,000.

The electrochemical cell is comprised of a negative electrode which intercalates with an alkali metal, and a positive electrode comprising an electrode active material which intercalates with the alkali metal. The preferred alkali metal is lithium. The electrodes are activated with the electrolyte comprising a lithium salt. According to the present invention, the electrolyte contains a lithium salt and poly(2-vinylpyridine) or its copolymers, or mixtures of them as an additive that improves the cycle life and shelf life of a lithium ion cell without sacrificing its capacity and rate performance.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which.

Figure 1:
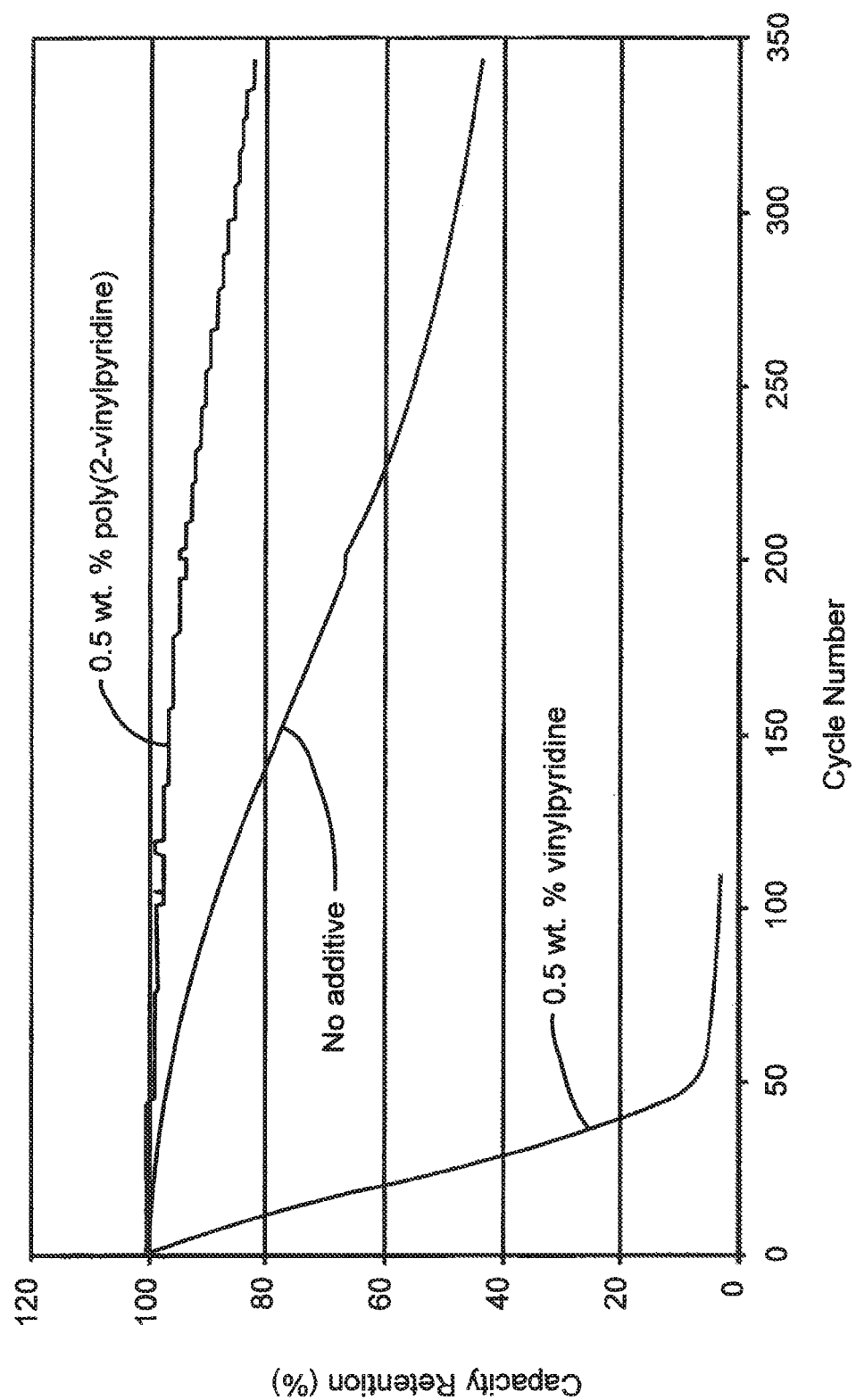
FIG. 1 is a graph of the cyclic performance of an exemplary cell containing an additive of vinylpyridine in comparison to a cell devoid of an electrolyte additive, both according to the prior art, and a cell with poly(2-vinylpyridine) as an electrolyte additive according to the present invention.

Accordingly, the present invention will be described in connection with preferred embodiments, however, it should be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode or negative electrode comprises a material capable of intercalating and de-intercalating the alkali metal, and preferably lithium. A carbonaceous anode comprising any of the various forms of carbon (e.g., coke, graphite, acetylene black, carbon black, glassy carbon, carbon nanotubes, etc.) which are capable of reversibly retaining the lithium species is preferred. Alternatively, the anode active material may be a metal or metal oxide such as silicon, tin, aluminum, zinc, silver and the various oxides thereof.

Graphite is particularly preferred due to its relatively high lithium-retention capacity. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates. Meso-carbon microbeads (MCMB) are one preferred carbonaceous anode material.

The anode for the secondary cell is fabricated by mixing about 90 to 97 weight percent of the carbonaceous anode material with about 3 to 10 weight percent of an electrode binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. Less than 3 weight percent of the binder provides insufficient cohesiveness to the loosely agglomerated electrode active materials to prevent delamination, sloughing and cracking during electrode preparation and cell fabrication and during cell discharge. More than 10 weight percent of the binder provides a cell with diminished capacity and reduced current density due to lowered electrode active density.

This negative electrode admixture is provided on a current collector selected from copper, stainless steel, titanium, tantalum, platinum, gold, aluminum, nickel, cobalt nickel alloy, highly alloyed ferritic stainless steel containing molybdenum and chromium, and nickel-, chromium-, and molybdenum-containing alloys. The current collector is a foil or screen and contact is by casting, pressing, or rolling the admixture thereto.

The anode component further has an extended tab or lead of the same material as the anode current collector, i.e., preferably nickel contacted by a weld to a cell case of conductive metal in a case-negative electrical configuration. Alternatively, the carbonaceous anode may be formed in some other geometry, such as a bobbin shape, cylinder or pellet to allow an alternate low surface cell design.

The cathode or positive electrode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCu_{0.92}Sn_{0.08}O_2$ and $LiCo_{1-x}Ni_xO_2$. In another embodiment, the active material has an olivine or NASICON structure of the formula $LiMPO_4$ where M is one or metals from columns 4 through 13 of the Periodic Table of the Elements. Preferably, M is iron or vanadium.

Before fabrication into an electrode for incorporation into an electrochemical cell, the lithiated active material (about 90 to 97 weight percent) is preferably mixed with a conductive additive (about 1 to 10 weight percent) and a binder (about 3 to 10 weight percent). In a similar manner as with the anode, suitable conductive additives for the cathode include acetylene black, carbon black, graphite and metals such as nickel, aluminum, titanium and stainless steel in powder form. Suitable fluoro-resin binders are preferably in a powder form and include PTFE, PVDF, ETFE, polyamides, polyimides, and mixtures thereof.

To discharge such secondary cells, lithium ions comprising the cathode are intercalated into the carbonaceous anode by applying an externally generated electrical potential to recharge the cell. The applied recharging electrical potential serves to draw lithium ions from the cathode material, through the electrolyte and into the carbonaceous anode to saturate the carbon comprising the anode. The resulting $Li_xC_6$ electrode can have an x ranging from about 0.1 to about 1.0. The cell is then provided with an electrical potential and discharged in a normal manner.

An alternate secondary cell construction comprises intercalating the carbonaceous material with lithium before the anode is incorporated into the cell. In that case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide, and fluorinated carbon. However, this approach is compromised by problems associated with handling lithiated carbon outside the cell. Lithiated carbon tends to react when contacted by air.

The secondary cell of the present invention includes a separator to provide physical segregation between the anode and cathode active electrodes. The separator is of an electrically insulative material to prevent an internal electrical short circuit between the electrodes. It also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet that is placed between the anode and cathode. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

In accordance with the present invention, an electrolyte for an electrochemical cell is provided comprising an organic solvent, an alkali metal salt, and a polymer additive. In general, the choice of an electrolyte solvent system for activating a lithium electrochemical cell, and particularly a fully charged lithium ion cell is limited due to the high potential of the cathode material (up to 4.3V vs. Li/Li$^+$ for Li$_{1-x}$CoO$_2$) and the low potential of the anode material (0.01V vs. Li/Li$^+$ for graphite). According to the present invention, suitable nonaqueous electrolytes are comprised of an inorganic salt dissolved in a nonaqueous solvent and more preferably a lithium salt dissolved in a mixture of organic carbonate solvents comprising dialkyl (non-cyclic) carbonates selected from dimethyl carbonate (DMC), diethyl carbonate (DEC), dipropyl carbonate (DPC), ethylmethyl carbonate (EMC), methylpropyl carbonate (MPC) and ethylpropyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such cell chemistries because they exhibit high oxidative stability toward cathode materials and good kinetic stability toward anode materials.

Preferred electrolytes according to the present invention comprise solvent mixtures of EC:DMC:EMC:DEC. Most preferred volume percent ranges for the various carbonate solvents include EC in the range of about 10% to about 50%; DMC in the range of about 5% to about 75%; EMC in the range of about 5% to about 50%; and DEC in the range of about 3% to about 45%. Electrolytes containing this quaternary carbonate mixture have a freezing point below −50° C., and lithium ion cells activated with such mixtures have very good cycling behavior at room temperature as well as very good charge/discharge cycling behavior at temperatures below −20° C.

Suitable lithium salts include LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiNO$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiCF$_3$SO$_3$, and mixtures thereof. Salt concentrations typically range from about 0.8 to about 1.8 molar.

According to the present invention, an electrolyte that is suitable for activating a lithium-ion secondary cell includes a polymer additive comprised of repeating vinyl units joined to one or more heterocyclic amine moieties. The polymer additive may be present at a concentration of from about 0.05 and about 1.0 weight percent of the electrolyte, and it preferably has a molecular weight of at least about 5,000. The heterocyclic amine may contain from five to ten ring atoms, inclusive. One preferred heterocyclic amine is pyridine, with the additive therefore being poly(2-vinylpyridine). Alternatively, the heterocyclic amine of the polymer may be a substituted pyridine, quinoline, imidazole, phthalimide, pyrimidine, piperidine, pyridazine, pyrazine, triazine, triazole, thiazole, and combinations thereof.

Alternatively, the additive may be a copolymer of the general formula:

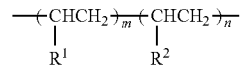

wherein R$^1$ is a heterocyclic amine containing five or six ring atoms, and R$^2$ is an aromatic compound, or an acrylate containing at least four carbon atoms. In the copolymer, m is preferably in the range of 20 to 100 mole percent, with n being in the corresponding range of 0 to 80 mole percent. R$^1$ may be selected from the above cited heterocyclic amines. R$^2$ may be an aromatic compound or an acrylate containing at least four carbon atoms. Exemplary compounds for R$^2$ are benzene, toluene, styrene, chlorobenzene, fluorobenzene, chlorotoluene, fluorotoluene, butylmethacrylate, and combinations thereof.

The electrolyte may also contain up to 6 weight percent of an additional additive such as vinylene carbonate, fluorinated ethylene carbonate, biphenyl, and biphenyl derivatives or cyclohexyl benzene to improve the cycle life or the safety of the cell.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

Accordingly, the following examples describe the manner and process of an electrochemical cell according to the present invention, and they set forth the best mode contemplated by the inventors of carrying out the invention, but they are not to be construed as limiting.

EXAMPLE

By way of illustration, and in no way intended to be limiting, two exemplary cells according to the present invention were prepared. Exemplary Cell I contained an electrolyte with the polymer additive being poly(2-vinylpyridine). Exemplary Cell II contained an electrolyte with the polymer additive being poly(2-vinylpyridine-co-styrene).

The anode active material in the exemplary cells was a layered carbon material, i.e. graphite. The anode slurry was prepared by kneading the anode active material, conducting carbon and polyvinylidene fluoride binder dissolved in N-methylpyrrolidinone (NMP). The anode contained about 2 weight percent of the conducting carbon and about 5 weight percent of the binder in the solid contents of the slurry. The anode slurry was then coated on both surfaces of a copper foil using wet-coating techniques and passed through a drier to remove the NMP. After drying, the anode was pressed to obtain a coating density of from about 1.25 and about 1.70 grams per milliliter.

The cathode slurry was prepared by mixing $LiCoO_2$ as the cathode active material, acetylene black as the conducting carbon and polyvinylidene fluoride binder dissolved in N-methylpyrrolidinone (NMP) by using a planetary mixer. The cathode contained about 2 weight percent of the conducting carbon and about 3 weight percent of the binder in the solid contents of the slurry by weight. The cathode slurry was coated onto an aluminum current collector followed by drying and roll pressing of the electrode to obtain a coating density of from about 3.0 to about 3.8 grams per milliliter. Although polyvinylidene fluoride (PVDF) was used as a binder in the cathodes and anodes of the exemplary cells, any polymer that is stable at less than 2 volts versus lithium and is insoluble in the electrolyte could be used.

The anode, cathode and a micro-porous polyolefin separator of polyethylene were stacked to form an electrode assembly, and then placed into flexible packaging film, activated with electrolyte, and hermetically sealed.

Comparative Example

For comparison, two cells were prepared in a similar manner as the above described present invention Cells I and II except Comparative Cell III an electrolyte additive of 2-vinylpyridine monomer and Comparative Cell IV had no polymer additive in its electrolyte.

Cells I to IV were then charged to 4.1V at a IC-rate with a cut-off current at C/20-rate, and discharged to 2.75V at a IC-rate. Table 1 summarizes the first cycle coulomb efficiency and voltage drop of the exemplary present invention Cells I and II and the comparative prior art Cells III and IV.

TABLE 1

| Cell | Additive | Coulomb efficiency of first cycle, % | Voltage after full charge to 4.1 V | Voltage after 1 month storage at RT | Voltage drop mV/day |
|---|---|---|---|---|---|
| I | poly(2-vinylpyridine) | 88.5 | 4.081 | 4.073 | 0.27 |
| II | poly(2-vinylpyridine-co-styrene) | 88.6 | 4.083 | 4.075 | 0.27 |
| III | vinylpyridine | 87.0 | 4.066 | 4.034 | 1.07 |
| IV | no additive | 89.5 | 4.081 | 4.066 | 0.50 |

Exemplary Cells I and II containing a polymer additive of the present invention had a reduced voltage drop during the one month storage period, and a similar coulomb efficiency compared to the additive free Cell IV. This indicates that the polymer additives in the exemplary cells improved their shelf life. In contrast, the 2-vinylpyridine monomer additive increases the voltage drop of Cell III and reduces its coulomb efficiency.

Without wishing to be bound to any particular theory, it is believed that these diminished discharge characteristics can be attributed to decomposition of the 2-vinylpyridine monomer additive forming a thick insulation layer on the anode surface-electrolyte-interface (SEI). This SEI layer accelerates lithium deposition at the anode, resulting in poor cycle life and a higher self discharge rate due to consumption of additional electrolyte on the anode surface.

FIG. 1 depicts the cyclic performance of the exemplary present invention Cell I and the comparative prior art Comparative Cells III and IV. It can be seen that the exemplary cell activated with an electrolyte containing the poly(2-vinylpyridine) additive according to the present invention showed superior cyclic performance compared to the additive free cell and the cell activated with an electrolyte containing vinylpyridine monomer additive, which showed extremely poor cyclic performance.

Figure 2:
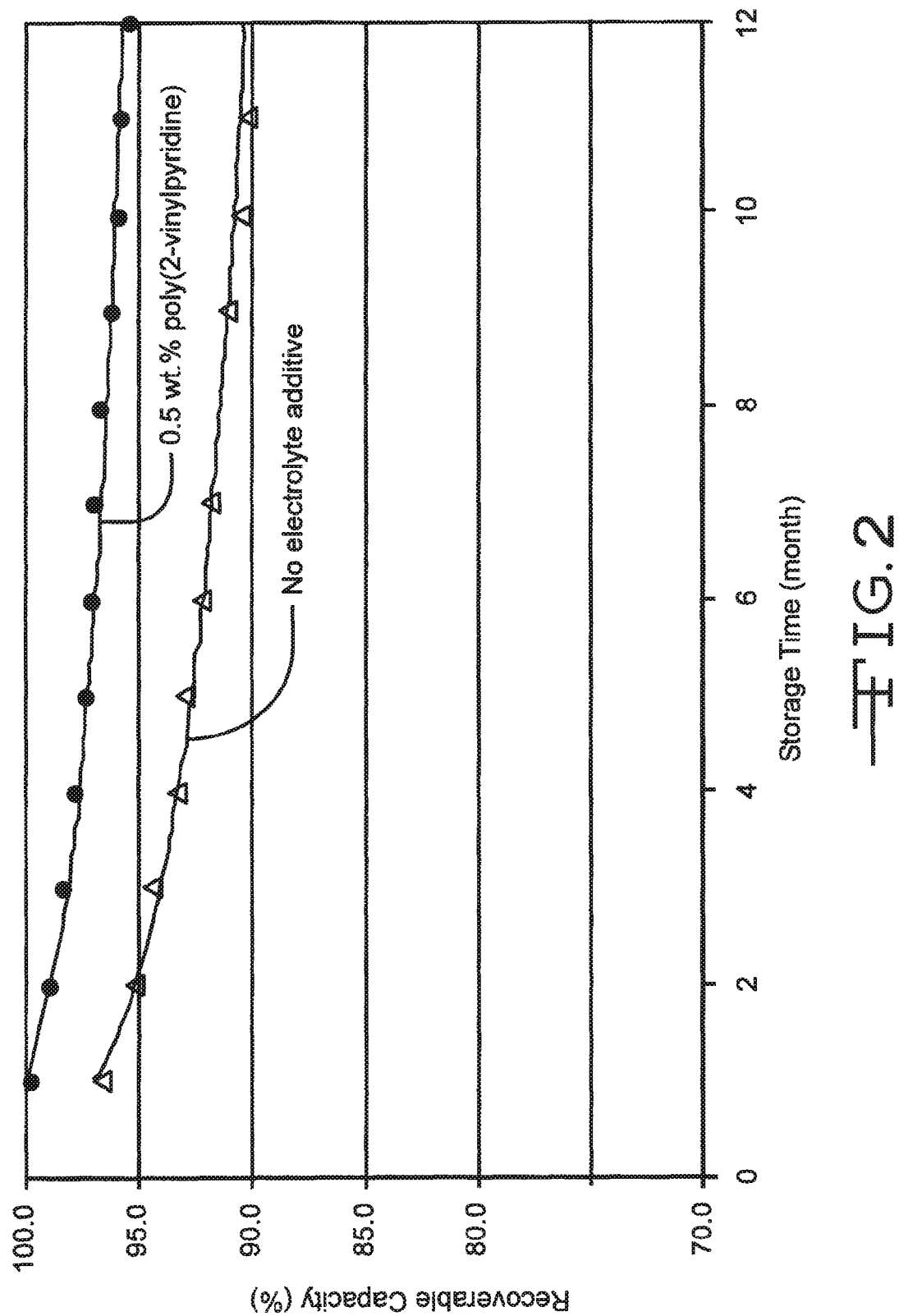
FIG. 2 is a graph of the recoverable capacity of a exemplary cell, according to the present invention, and a prior art cell with no electrolyte additive, both after storage at 37° C. for seven months.

FIG. 2 depicts the recoverable capacity of the Cells I to IV after storage at 37° C. for seven months. The cells were discharged and charged three times each month at C/5-rate during storage at 37° C. to obtain the recoverable capacity of the cells, and then stored again at 37° C. at a fully charged state (4.1V). The exemplary present invention Cell I with the electrolyte containing the poly(2-vinylpyridine) additive had almost 90% of recoverable capacity, which is superior to the approximately 86% of recoverable capacity of the additive free cell.

It is, therefore, apparent that there has been provided, in accordance with the present invention, a rechargeable secondary electrochemical cell having an improved electrolyte. The electrolyte includes a polymer additive comprised of repeating vinyl units joined to one or more heterocyclic amine moieties. While this invention has been described in conjunction with preferred embodiments thereof, it is evident that many alternatives, modifications, and variations will be apparent to those skilled in the art. Accordingly, the present invention is intended to embrace all such alternatives, modifications and variations that fall within the broad scope of the appended claims.

What is claimed is:

1. An electrolyte for an electrochemical cell, the electrolyte comprising:
   a) a linear carbonate mixture of dimethyl carbonate (DMC), ethylmethyl carbonate (EMC), and diethyl carbonate (DEC), wherein by volume percent, DMC is in the range of from about 5% to about 75%; EMC is in the range of from about 5% to about 50%; and DEC is in the range of from about 3% to about 45%;
   b) ethylene carbonate (EC) as a cyclic carbonate, wherein the EC is in the range of from about 10% to about 50% by volume percent;
   c) a lithium salt; and
   d) poly(2-vinylpyridine-co-styrene) at a concentration of from about 0.05 to less than 1.0 weight percent.

2. The electrolyte of claim 1 wherein the poly(poly(2-vinylpyridine-co-styrene) comprises a molecular weight of 5,000.

3. The electrolyte of claim 1 wherein the lithium salt is selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

4. The electrolyte of claim 1 further comprising an additional additive selected from the group consisting of vinylene carbonate, fluorinated ethylene carbonate, biphenyl, cyclohexyl benzene, and combinations thereof.

5. The electrolyte of claim 1 not including a biphenyl compound.

6. An electrochemical cell comprising:
   a) a negative electrode comprising an anode active material which intercalates with lithium;

b) a positive electrode comprising a cathode active material which intercalates with lithium;
c) a separator intermediate the negative and positive electrodes to thereby prevent the electrodes from direct physical contact with each other; and
d) an electrolyte activating the negative and positive electrodes, the electrolyte comprising:
  i) a linear carbonate mixture of dimethyl carbonate (DMC), ethylmethyl carbonate (EMC), and diethyl carbonate (DEC), wherein by volume percent, DMC is in the range of from about 5% to about 75%; EMC is in the range of from about 5% to about 50%; and DEC is in the range of from about 3% to about 45%;
  ii) ethylene carbonate (EC) as a cyclic carbonate, wherein the EC is in the range of from about 10% to about 50% by volume percent;
  iii) a lithium salt; and
  iv) poly(2-vinylpyridine-co-styrene) at a concentration of from about 0.05 to less than 1.0 weight percent.

7. The electrochemical cell of claim 6 wherein the poly (2-vinylpyridine-co-styrene) comprises a molecular weight of 5,000.

8. The electrochemical cell of claim 6 wherein the electrolyte does not include a biphenyl compound.

9. The electrochemical cell of claim 6 wherein the anode active material comprises a carbonaceous material selected from coke, graphite, acetylene black, carbon black, glassy carbon, carbon nanotubes, and meso-carbon microbeads.

10. The electrochemical cell of claim 9 wherein the carbonaceous material is fibrous.

11. The electrochemical cell of claim 6 wherein the negative electrode comprises from about 90 to 97 weight percent graphite as the anode active material mixed with from about 3 to 10 weight percent of a fluoro-resin binder.

12. The electrochemical cell of claim 6 wherein the negative electrode comprises a current collector selected from the group consisting of copper, stainless steel, titanium, tantalum, platinum, gold, aluminum, nickel, cobalt nickel alloy, highly alloyed ferritic stainless steel containing molybdenum and chromium, and nickel-, chromium-, and molybdenum-containing alloys.

13. The electrochemical cell of claim 6 wherein the positive electrode comprises from about 90 to 97 weight percent $LiCoO_2$ as the cathode active material mixed with from about 1 to 10 weight percent of a conductive additive and from about 3 to 10 weight percent of a fluoro-resin binder.

14. The electrochemical cell of claim 6 wherein the cathode active material is selected from the group consisting of $LiNiO_2$, $LiMn_2O_4$, $LiCoO_2$, $LiCo_{0.92}Sn_{0.08}O_2$, lithium cobalt nickel oxide, and $LiMPO_4$ (where M is one or metals from columns 4 through 13 of the Periodic Table of the Elements).

15. The electrochemical cell of claim 6 wherein the lithium salt is selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

16. A method for making an electrochemical cell, comprising the steps of:
a) providing a negative electrode of an anode active material which intercalates with lithium;
b) providing a positive electrode comprising a cathode active material which intercalates with the lithium;
c) disposing a separator intermediate the negative and positive electrodes to thereby prevent the electrodes from direct physical contact with each other; and
d) activating the negative and positive electrodes with a nonaqueous electrolyte comprising:
  i) a linear carbonate mixture of dimethyl carbonate (DMC), ethylmethyl carbonate (EMC), and diethyl carbonate (DEC), wherein by volume percent, DMC is in the range of from about 5% to about 75%; EMC is in the range of from about 5% to about 50%; and DEC is in the range of from about 3% to about 45%;
  ii) ethylene carbonate (EC) as a cyclic carbonate, wherein the EC is in the range of from about 10% to about 50% by volume percent;
  iii) a lithium salt; and
  iv) poly(2-vinylpyridine-co-styrene) at a concentration of from about 0.05 to less than 1.0 weight percent.

17. The method of claim 16 including mixing from about 90 to 97 weight percent graphite as the anode active material with from about 3 to 10 weight percent of a binder to thereby provide an anode active material mixture containing the anode active material for the negative electrode.

18. The method of claim 17 wherein the binder is selected from the group consisting of polytetrafluoroethylene (PTFE), polyvinylidene fluoride (PVDF), polyethylenetetrafluoroethylene (ETFE), polyamides, polyimides, and mixtures thereof.

19. The method of claim 16 including contacting the anode active material to a current collector selected from the group consisting of copper, stainless steel, titanium, tantalum, platinum, gold, aluminum, nickel, cobalt nickel alloy, highly alloyed ferritic stainless steel containing molybdenum and chromium, and nickel-, chromium-, and molybdenum-containing alloys.

20. The method of claim 16 including mixing from about 90 to 97 weight percent $LiCoO_2$ as the cathode active material mixed with from about 1 to 10 weight percent of a conductive additive and from about 3 to 10 weight percent of a fluoro-resin binder to thereby provide a cathode active material mixture containing the cathode active material for the positive electrode.

21. The method of claim 16 including providing the poly(2-vinylpyridine-co-styrene) comprising a molecular weight of 5,000.

22. The method of claim 16 including selecting the lithium salt from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

23. The method of claim 16 wherein the electrolyte does not include a biphenyl compound.

24. The method of claim 16 including selecting the anode active material from the group consisting of coke, graphite, acetylene black, carbon black, glassy carbon, carbon nanotubes, and meso-carbon microbeads.

25. The method of claim 16 including providing the anode active material as a fibrous carbonaceous material.

26. The method of claim 16 including selecting the cathode active material from the group consisting of $LiNiO_2$, $LiMn_2O_4$, $LiCoO_2$, $LiCo_{0.92}Sn_{0.08}O_2$, lithium cobalt nickel oxide, and $LiMPO_4$ (where M is one or metals from columns 4 through 13 of the Periodic Table of the Elements).

* * * * *